Figure 1:
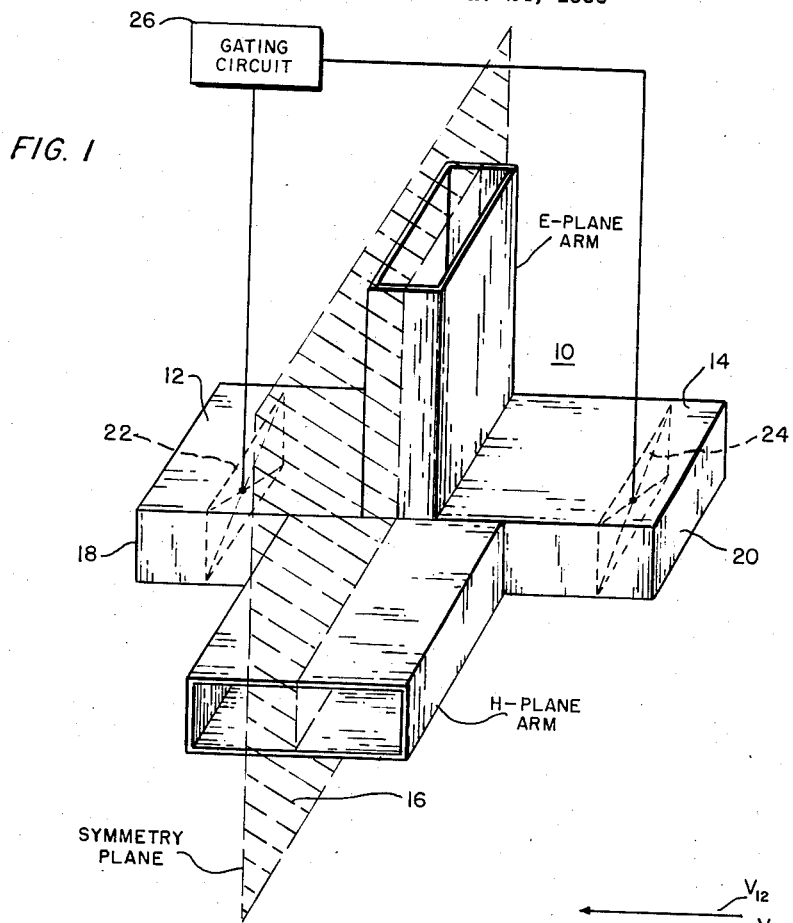

July 8, 1958

G. L. BURTON 2,842,745

WAVEGUIDE SWITCH

Filed Jan. 24, 1956

INVENTOR,
GORDON L. BURTON.

BY

ATTORNEY.

United States Patent Office 2,842,745
Patented July 8, 1958

2,842,745

WAVEGUIDE SWITCH

Gordon L. Burton, Harvard, Mass., assignor to the United States of America as represented by the Secretary of the Army Application January 24, 1956, Serial No. 564,625

7 Claims. (Cl. 333—7)

This invention relates to waveguide switches and more particularly to phase commutating circuits adapted to operate at very high radio-frequency levels.

It is sometimes required to amplify two separate radio-frequency signals in such a way as to preserve their relative phase. When such is the case, it is desirable to minimize the effect of different gain and phase characteristics on the two signals. One conventional method of accomplishing this involves 180° phase-commutation of the input signals, and once commutated the signals can be alternately sent through the same receiver or, if preferred, two receivers may be utilized. For high radio-frequency level operation such circuits have heretofore consisted of a ferrite core in a section of circular waveguide to produce phase shifts of +90° and —90° when a magnetic field was applied first in one direction and then in the other direction. However, it has been found that the power handling capacity of such a device is rather limited due to the inherent electrical characteristics of the ferrite. Further limitation in the use of such a device is the difficulty of securing a perfect match.

It is, therefore, an object of the present invention to provide an improved radio-frequency phase commutator wherein these limitations are overcome.

It is yet another object of the present invention to provide a radio-frequency phase commutator adapted to provide periodic sudden changes in phase shifts.

It is still another object of the present invention to provide a radio-frequency phase commutator of relatively simple construction which can be theoretically perfectly matched.

In brief, the present invention includes a magic T balanced duplexer having its colinear side arms short-circuited in planes equidistant from the plane of symmetry, and having radio-frequency energy of a prescribed wavelength coupled to its H-plane or parallel arm. Also included are normally open short-circuiting means positioned across the radio-frequency path in each of the colinear arms, and means for alternately activating the short-circuiting means. The short-circuiting means are positioned relative to the plane of symmetry such that radio-frequency energy is coupled in one prescribed phase to the E-plane or series arm of the magic T when one of the short-circuiting means is activated, and 180° out of phase with this prescribed phase when the other short-circuiting means is activated.

Figure 2:
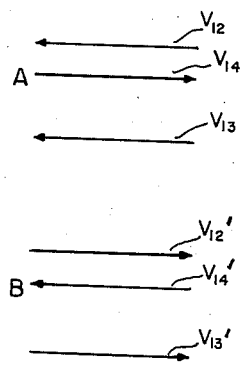

For a better understanding of the invention, together with other and further objects thereof, reference is had to the following description taken in connection with the accompanying drawing, in which:

Fig. 1 illustrates a phase commutating circuit towards which the invention is directed, and Figs. 2A and 2B are explanatory diagrams.

Referring now to the drawing, there is shown at 10 a type of balanced hybrid waveguide duplexer known as a magic T comprising an E-plane or series arm, an H-plane or parallel arm and two colinear or symmetrical arms 12 and 14. The E-plane arm and the H-plane arm are at right angles to each other and to the colinear arms 12 and 14, and the entire device is completely symmetric about a plane represented by the broken lines 16, hereinafter referred to as the plane of symmetry, which bisects the E-plane and the H-plane T's. Arms 12 and 14 are terminated by respective metallic end plates 18 and 20 in planes equidistant from the plane of symmetry. Intermediate the respective terminating end plates 18 and 20 and the plane of symmetry there are provided respective switches 22 and 24 which are normally in the open or "off" position and are disposed across the radio-frequency path in each colinear arm. These switches are so constructed and arranged that when they are electrically "off" or open they do not impede the flow of radio-frequency energy in their respective colinear arms, but when electrically "on" or closed, they provide the equivalent of a short circuit placed across the radio-frequency path. Such switching devices are well known in the art and may comprise, for example, spark gaps functioning as TR or ATR boxes, a volume of gas which can be readily ionized or deionized, or a mechanically driven metallic switch introduced between choke joints. The switches are disposed within their respective colinear arms such that the difference in path length from the plane of symmetry to the terminating end plate of one colinear arm and from the plane of symmetry to the switch in the other colinear arm is an odd number of quarter-wavelengths at a prescribed operating frequency. Switches 22 and 24 are turned alternately "on" and "off" at a desired rate of commutation by means of a gating circuit 26, or by any other suitable means well known in the art, each "on" period being of a prescribed duration. For example, the output of gating circuit 26 may constitute a series of periodically recurring rectangular shaped pulses having its output synchronized with the PRF of a radar such that each "on" period of the respective switches is approximately equal to the interpulse period of the radar.

In discussing the operation of the present invention, let it be assumed that the radio-frequency energy to be commutated is applied to the H-plane arm and that the E-plane arm is properly terminated by a matched load. Let it further be assumed that the output of gating circuit 26 is such that switch 22 in colinear arm 12 is "on" and switch 24 in colinear arm 14 is "off." In accordance with well known principles, at the center of the junction of the H-plane T the wave energy from the H-plane arm will divide equally between colinear arms 12 and 14 such that the wave energy traveling outwardly from the junction have the same phase at planes equidistant from the plane of symmetry. With switch 22 "on" and switch 24 "off" the waves excited in the arms 12 and 14 are reflected toward the junction, or plane of symmetry, from the short-circuiting planes formed respectively by switch 22 and end plate 20. Since the radio-frequency path in arm 14 is now an odd number of quarter-wavelengths longer than the radio-frequency path in arm 12, the reflected energy arriving at the junction from the respective short-circuiting planes will be relatively 180° out-of-phase. Hence, no energy will be reflected back to the H-plane arm but will be coupled into the E-plane arm. Now, assuming that vectors $V_{12}$ and $V_{14}$ in Fig. 2A represent the relative phase relationship between the reflected waves at the junction under these conditions, then the phase of the input energy coupled to the E-plane arm may be represented by the vector $V_{13}$. When switch 24 is "on" and switch 22 is "off," the relative phase of $V_{12}$ and $V_{14}$ will be reversed as represented by vectors $V_{12'}$ and $V_{14'}$ in Fig. 2B, inasmuch as the path in arm 12 is now an odd number of quarter-wavelengths longer than the path in arm 14 which is now short circuited by switch 24. Hence, the corresponding output from the E-plane arm with switch 24 "on" and switch 22 "off" will be 180° out-of-phase with the output obtained when switch 22 is "on" and switch 24 is "off," and may be represented by vector $V_{13'}$. Thus 180° phase commutation of the input radio-frequency energy is instantaneously achieved.

Although the invention has been described in connection with one type of magic T it is to be understood that it is not to be limited thereto. Other types of balanced duplexers may be used which operate in a manner similar to the type of the magic T described. For example, a ring circuit magic T illustrated on page 357 of volume 14 of the MIT Radiation Laboratory series, "Microwave Duplexers," may be used and operated in the manner described.

While there has been described what is at present considered to be the preferred embodiment of this invention, it will be obvious to those skilled in the art that various changes and modifications may be made therein without departing from the invention.

What is claimed is:

1. In combination with a magic T waveguide duplexer having its colinear side arms short-circuited in planes equidistant from the plane of symmetry and having radio-frequency energy of prescribed wavelength coupled to its H-plane arm, means for phase commutating the radio-frequency energy coupled to the E-plane arm of said magic T comprising, normally open short-circuiting means positioned in each of said colinear arms, means for alternately activating said short-circuiting means, said short-circuiting means being positioned relative to said plane of symmetry such that energy is coupled in one prescribed phase to said E-plane arm when one of said short-circuiting means is activated, and 180° out of phase with said prescribed phase when the other of said short-circuiting means is activated.

2. In combination with a magic T waveguide duplexer having its colinear side arms short-circuited in planes equidistant from the plane of symmetry and having radio-frequency energy of a prescribed wavelength coupled to its H-plane arm, normally open switch means disposed across the radio-frequency path in each of said colinear arms intermediate said plane of symmetry and a respective short-circuited plane, means for alternately closing each of said switch means whereby the radio-frequency path in each of said arms is alternately short-circuited by said switch means, said switch means being respectively positioned so that the reflected radio-frequency energy from the closed switch means in one colinear arm and the short-circuited plane in the other colinear arm are combined in the E-plane arm in one prescribed phase, and the reflected energy from the closed switch in said other arm and the short-circuited plane in said one arm are combined in the E-plane arm 180° out-of-phase with said prescribed phase.

3. In combination with a magic T waveguide duplexer having its colinear side arms short-circuited in planes equidistant from the plane of symmetry and having radio-frequency energy of a prescribed wavelength coupled to its H-plane arm, means for phase commutating the radio-frequency energy coupled to the E-plane arm of said magic T comprising a normally open switch disposed respectively within each of said colinear arms intermediate said plane of symmetry and a respective short-circuiting plane, said switches being so positioned that the difference in radio-frequency path lengths between the switch in one colinear arm and the short-circuiting plane in the other colinear arm with respect to the plane of symmetry is an odd number of quarter-wavelengths, and means in circuit with said switches for alternately gating said switches whereby when one of said switches is open the other of said switches is closed.

4. In combination with a balanced magic T waveguide duplexer having its colinear side arms short-circuited in planes equidistant from the plane of symmetry and having radio-frequency energy of prescribed wavelength coupled to its H-plane arm, means for phase commutating the radio-frequency energy coupled to the E-plane arm of said magic T comprising, normally open short-circuiting means positioned in each of said colinear arms, and means for alternately activating said short-circuiting means, said short-circuiting means being positioned relative to said plane of symmetry such that the phase of the radio-frequency energy coupled to said E-plane arm is abruptly shifted when said short-circuiting means are alternately activated.

5. A system for commutating radio-frequency energy comprising a balanced hybrid waveguide duplexer having a pair of colinear arms and a pair of branch arms arranged symmetrically about a plane bisecting said branch arms, discrete short-circuiting means disposed equidistant from said plane and terminating each of said colinear arms, normally open switch means disposed respectively within each of said colinear arms intermediate said plane and a respectively short-circuiting means, and means for alternately activating said switch means, said switch means being so positioned relative to said plane such that there is an abrupt shift in phase of the radio-frequency energy coupled from one branch arm to the other branch arm when said switches are alternately activated.

6. The system in accordance with claim 5 wherein said switch means are positioned such that the difference in radio-frequency path lengths between the switch in one colinear arm and the short-circuiting means in the other colinear arm with respect to said plane is an odd number of quarter-wavelengths.

7. A commutator for radio-frequency energy comprising a balanced hybrid waveguide duplexer having a pair of colinear arms and a pair of branch arms, said colinear and branch arms being symmetrically arranged about a plane bisecting said branch arms, discrete short-circuiting means disposed equidistant from said plane and terminating each of said colinear arms, normally open switch means disposed respectively within each of said colinear arms intermediate said plane and a respective short-circuiting means, said switches being positioned relative to said plane such that the difference in radio-frequency path lengths between the switch in one colinear arm and the shorting means in the other colinear arm with respect to said plane is an odd number of prescribed wavelengths.

References Cited in the file of this patent
UNITED STATES PATENTS
2,757,341    Lundstrom _____ July 31, 1956